US010789305B2

(12) United States Patent
Skrenta et al.

(10) Patent No.: US 10,789,305 B2
(45) Date of Patent: Sep. 29, 2020

(54) SEARCH ENGINE RESULTS

(71) Applicant: International Business Machines Corporation, Armonk, NY (US)

(72) Inventors: Rich Skrenta, San Carlos, CA (US); Michael Markson, San Mateo, CA (US); Thomas M. Annau, San Carlos, CA (US); Robert Michael Saliba, San Francisco, CA (US); Nicholas Sorrentino, San Mateo, CA (US); Krishna Srinivasan, Union City, CA (US); Dan Swartz, Mountain View, CA (US); Jacques Frechet, Oakland, CA (US); Chris Zimdars, Pacifica, CA (US); Gregory B. Lindahl, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 1094 days.

(21) Appl. No.: 14/719,106

(22) Filed: May 21, 2015

(65) Prior Publication Data
US 2015/0254356 A1    Sep. 10, 2015

Related U.S. Application Data

(63) Continuation of application No. PCT/US2013/070997, filed on Nov. 20, 2013.
(Continued)

(51) Int. Cl.
*G06F 16/951* (2019.01)
*G06F 16/248* (2019.01)
(Continued)

(52) U.S. Cl.
CPC .......... *G06F 16/951* (2019.01); *G06F 16/248* (2019.01); *G06F 16/287* (2019.01);
(Continued)

(58) Field of Classification Search
None
See application file for complete search history.

(56) References Cited

U.S. PATENT DOCUMENTS 5,940,821 A * 8/1999 Wical ................... G06F 16/3338
6,006,225 A * 12/1999 Bowman ............. G06F 16/3325
(Continued)

FOREIGN PATENT DOCUMENTS

EP    2665003 A1 * 11/2013    ......... G06F 16/2462

OTHER PUBLICATIONS

Wikipedia. "Lookup table". May 5, 2012 snapshot via Archive.org. URL Link: https://en.wikipedia.org/wiki/Lookup_table. Accessed Jul. 2018. (Year: 2012).*
(Continued)

*Primary Examiner* — Neveen Abel Jalil
*Assistant Examiner* — Irene Baker
(74) *Attorney, Agent, or Firm* — Zilka-Kotab, P.C.

(57) ABSTRACT

Systems and method for searching a network, including, via a server in communication with at least one data storage and a network, receiving search criteria via the network, retrieving sub search criteria related to the search criteria from the data storage, retrieving search results from the at least one data storage using the search criteria, retrieving sub search results from the at least one data storage, using the sub search criteria, organizing the search results and sub search results according to the sub search criteria, and causing display, via the network, of the organized search results and sub search results, grouped by sub search criteria.

23 Claims, 4 Drawing Sheets

Related U.S. Application Data

(60) Provisional application No. 61/729,252, filed on Nov. 21, 2012.

(51) Int. Cl.
  *G06F 16/28* (2019.01)
  *G06F 16/9038* (2019.01)
  *G06Q 30/02* (2012.01)
  *H04L 29/08* (2006.01)

(52) U.S. Cl.
  CPC ..... *G06F 16/9038* (2019.01); *G06Q 30/0256* (2013.01); *H04L 67/02* (2013.01)

(56) References Cited

U.S. PATENT DOCUMENTS

| | | | | |
|---|---|---|---|---|
| 6,081,804 | A * | 6/2000 | Smith | G06F 16/90344 707/696 |
| 6,243,713 | B1 * | 6/2001 | Nelson | G06F 16/40 |
| 6,434,556 | B1 * | 8/2002 | Levin | G06F 16/338 |
| 6,638,314 | B1 | 10/2003 | Meyerzon et al. | |
| 2002/0120714 | A1 | 8/2002 | Agapiev | |
| 2003/0195877 | A1 * | 10/2003 | Ford | G06Q 30/02 |
| 2005/0289119 | A1 * | 12/2005 | Weinberg | G06F 16/284 |
| 2006/0184512 | A1 * | 8/2006 | Kohanim | G06F 16/9038 |
| 2007/0038616 | A1 * | 2/2007 | Guha | G06F 17/30672 |
| 2007/0100801 | A1 * | 5/2007 | Celik | G06F 17/30386 |
| 2007/0150614 | A1 | 6/2007 | Ramachandran et al. | |
| 2007/0244900 | A1 * | 10/2007 | Hopkins | G06F 16/954 |
| 2008/0005072 | A1 * | 1/2008 | Meek | G06F 16/9535 |
| 2008/0275863 | A1 * | 11/2008 | Dominowska | G06Q 30/02 |
| 2009/0012940 | A1 * | 1/2009 | Ives | G06F 16/9535 |
| 2009/0094234 | A1 * | 4/2009 | Marvit | G06F 17/30672 |
| 2010/0082431 | A1 | 4/2010 | Ramer et al. | |
| 2010/0332479 | A1 | 12/2010 | Prahlad et al. | |
| 2011/0208710 | A1 * | 8/2011 | Lesavich | G06F 16/951 707/706 |
| 2013/0080426 | A1 * | 3/2013 | Chen | G06F 16/583 707/723 |
| 2013/0117297 | A1 * | 5/2013 | Liu | G06F 16/3322 707/767 |
| 2013/0268331 | A1 * | 10/2013 | Bitz | G06Q 30/0631 705/14.16 |
| 2014/0149373 | A1 * | 5/2014 | Annau | G06F 16/90328 707/706 |

OTHER PUBLICATIONS

Wikipedia. "Wide area network". Oct. 25, 2012 snapshot via Archive.org. URL Link: https://en.wikipedia.org/wiki/Wide_area_network. Accessed Jul. 2018. (Year: 2012).*

Techopedia. "Wide Area Network (WAN)". Oct. 25, 2012 snapshot via Archive.org. URL Link: https://www.techopedia.com/definition/5409/wide-area-network-wan. Accessed Jul. 2018. (Year: 2012).*

Wikipedia. "Cloud storage". Jul. 23, 2018 snapshot. URL Link: https://en.wikipedia.org/wiki/Cloud_storage. Accessed Jul. 2018. (Year: 2018).*

Wikipedia. "Search advertising". Jul. 23, 2018 snapshot. URL Link: https://en.wikipedia.org/wiki/Search_advertising. Accessed Jul. 2018. (Year: 2018).*

Wikipedia. "Query expansion". Oct. 11, 2012 snapshot via Archive.org. URL Link: https://en.wikipedia.org/wiki/Query_expansion. Accessed Jul. 2018. (Year: 2012).*

Manning et al. "Introduction to Information Retrieval". Cambridge University Press. 2008. ch. 9, pp. 177-194. URL Link: https://nlp.stanford.edu/IR-book. Accessed Jul. 2018. (Year: 2008).*

Abberley et al. "The THISL broadcast news retrieval system". In Proc. ESCA ETRW Workshop Accessing Information in Spoken Audio, (Cambridge), pp. 14-19, 1999. URL Link: http://homepages.inf.ed.ac.uk/srenals/pubs/1999/esca99-thisl/node6.html. Accessed Jul. 2018. (Year: 1999).*

Navigli et al. "An Analysis on Ontology-based Query Expansion Strategies". Proc. of Workshop on Adaptive Text Extraction and Mining (ATEM 2003), in the 14th European Conference on Machine Learning (ECML 2003), Cavtat-Dubrovnik, Croatia, Sep. 22-26, 2003. pp. 42-49. Accessed Jul. 2018. (Year: 2003).*

Efthimiadis. "Query Expansion". In: Martha E. Williams (ed.), Annual Review of Information Systems and Technology (ARIST), v31, pp. 121-187, 1996—An introduction for less-technical viewers. URL Link: http://faculty.washington.edu/efthimis/pubs/Pubs/qe-arist/QE-arist.html. Accessed Jul. 2018. (Year: 1996).*

International Search Report and Written Opinion from PCT Application No. PCT/US2013/070997, dated May 8, 2014.

"Query Expansion," 2007, 2 pages, retrieved from https://web.archive.org/web/20070328204357/http://homepages.inf.ed.ac.uk/srenals/pubs/1999/esca99-thisl/node6.html.

\* cited by examiner

SEARCH ENGINE RESULTS

CROSS REFERENCE TO RELATED APPLICATIONS

This patent application claims priority from and is related to International application no. PCT/US13/70997 filed 20 Nov. 2013, which claims priority from U.S. provisional application 61/729,252 filed 21 Nov. 2012, which are hereby incorporated by reference in their entirety.

TECHNICAL FIELD

This application relates to the field of digital computing, data processing, search engines and the internet. This also includes data structures and database/file access and management for, in particular, propagating, searching, retrieving and displaying data.

BACKGROUND

Search engines are used to scour resources on networks such as the internet and return relevant web pages, documents and other information to a searching user. These searches are done using any number of methods for conducting them and also displaying search results. Older methods employ keyword searches typed into a search engine which matches the keyword to results and displays links to the results in a list format. These typical searches do not take into account any other search terms than the input terms from the user. Further, these typical search results are displayed as lists, often in order of either the amount paid to the search engine company by the source, or by the number of links to the pages from other pages.

Additionally, there are many problems today in searching and displaying search results on popular computing devices. These include limitations placed on the user by the input mechanics of various devices. This is because search engine result pages are geared for laptop or desktop devices with mouse cursors and physical keyboards.

SUMMARY

This disclosure relates to methods and systems for managing search engine queries and result returns.

The database system could include a search engine. Some embodiments include a method of searching a network, including, via a server in communication with at least one data storage and a network, receiving search criteria via the network, retrieving sub search criteria related to the search criteria from the data storage, retrieving search results from the at least one data storage using the search criteria, retrieving sub search results from the at least one data storage, using the sub search criteria, organizing the search results and sub search results according to the sub search criteria, and causing display, via the network, of the organized search results and sub search results, grouped by sub search criteria.

Some embodiments have the display of the organized search results includes at least one of, headings, photos and sub search criteria information. Some embodiments include the network as a wide area network. Certain embodiments include wherein the grouped display of search results and sub search results includes scrollable bands according to sub search criteria, the scrollable bands including, labels for the sub search criteria, and sub search criteria results of the corresponding sub search results.

Certain embodiments have the display further including a top results band including a summary of the search criteria results. Some embodiments include the bands which further include, tiles of sub search results, including at least one of a photo, link, title, and summary.

Some embodiments have the method wherein the sub search criteria includes a slashtag operator. Certain embodiments include the method wherein the sub search criteria includes a slashtag operator. Certain embodiments further comprise, via the server in communication with the at least one database and the network, correlating the search results to at least one related advertisement. And some further include via the server in communication with the at least one data storage and the network, correlating the sub search results to at least one related advertisement. Some embodiments further comprise, via the server in communication with the at least one database and the network, retrieving the at least one correlated advertisement related to the search results, retrieving the at least one correlated advertisement related to the sub search results, and causing display, via the network, of the retrieved related correlated advertisement related to the search results, and of the retrieved related correlated advertisement related to the sub search results.

Certain embodiments have the data storage is a cloud based data storage. And some embodiments further comprise via the server, matching the sub search criteria to the search criteria based on the relevance between them, and storing the matching information between the sub search criteria and the search criteria in the data storage, to enable retrieval of the matched sub search criteria when the data storage is queried with the search criteria. Certain embodiments include wherein the stored matching information between the sub search criteria and the search criteria is in the form of a look up table. And some include wherein the slashtag operator is stored in the data storage. And some embodiments have wherein the slashtag operator is stored in the data storage.

Certain embodiments further comprise, via the server, requesting a login credential. And some embodiments further comprise, via the server, linking the login credential to a third party website. Some include wherein the third party website is a social networking website. Some embodiments further comprise, via the server, sending information relating to the search and sub search to the social networking site, to be displayed on the logged in user social networking site.

Some embodiment methods include a system of searching a network, comprising, a server in communication with at least one data storage and a network, configured to, receive search criteria via the network, retrieve sub search criteria related to the search criteria from the data storage, retrieve search results from the at least one data storage using the search criteria, retrieve sub search results from the at least one data storage, using the sub search criteria, organize the search results and sub search results according to the sub search criteria, and cause display, via the network, of the organized search results and sub search results, grouped by sub search criteria.

Some embodiments include wherein the display of the organized search results includes at least one of, headings, photos and sub search criteria information. Some have the network as a wide area network. Some embodiment systems have the grouped display of search results and sub search results includes scrollable bands according to sub search criteria, the scrollable bands including, labels for the sub search criteria, and sub search criteria results of the corresponding sub search results.

Certain embodiments have the system wherein the display further includes a top results band including a summary of the search criteria results. And in some systems the bands further include, tiles of sub search results, including at least one of a photo, link, title, and summary. Some embodiments have wherein the sub search criteria includes a slashtag operator.

Some embodiments have the sub search criteria include a slashtag operator. And some have the server further configured to, correlate the search results to at least one related advertisement. Certain embodiments include wherein the server is further configured to, correlate the sub search results to at least one related advertisement.

In certain embodiments, the system has the server further configured to, retrieve at least one correlated advertisement related to the search results from the at least one database using the search criteria, retrieve at least one correlated advertisement related to the sub search results from the at least one data storage, using the sub search criteria, and cause display, via the network, of the retrieved related correlated advertisement in the corresponding search and sub search group.

In some embodiments, the data storage is a cloud based data storage. In some embodiments, the system server is further configured to, match the sub search criteria to the search criteria based on the relevance between them, and store the matching information between the sub search criteria and the search criteria in the data storage, to enable retrieval of the matched sub search criteria when the data storage is queried with the search criteria. Certain embodiments include wherein the stored matching information between the sub search criteria and the search criteria is in the form of a look up table.

BRIEF DESCRIPTION OF THE DRAWINGS

For a better understanding of the embodiments described in this application, reference should be made to the Description of Embodiments below, in conjunction with the following drawings in which like reference numerals refer to corresponding parts throughout the figures.

DETAILED DESCRIPTION

Figure 1:
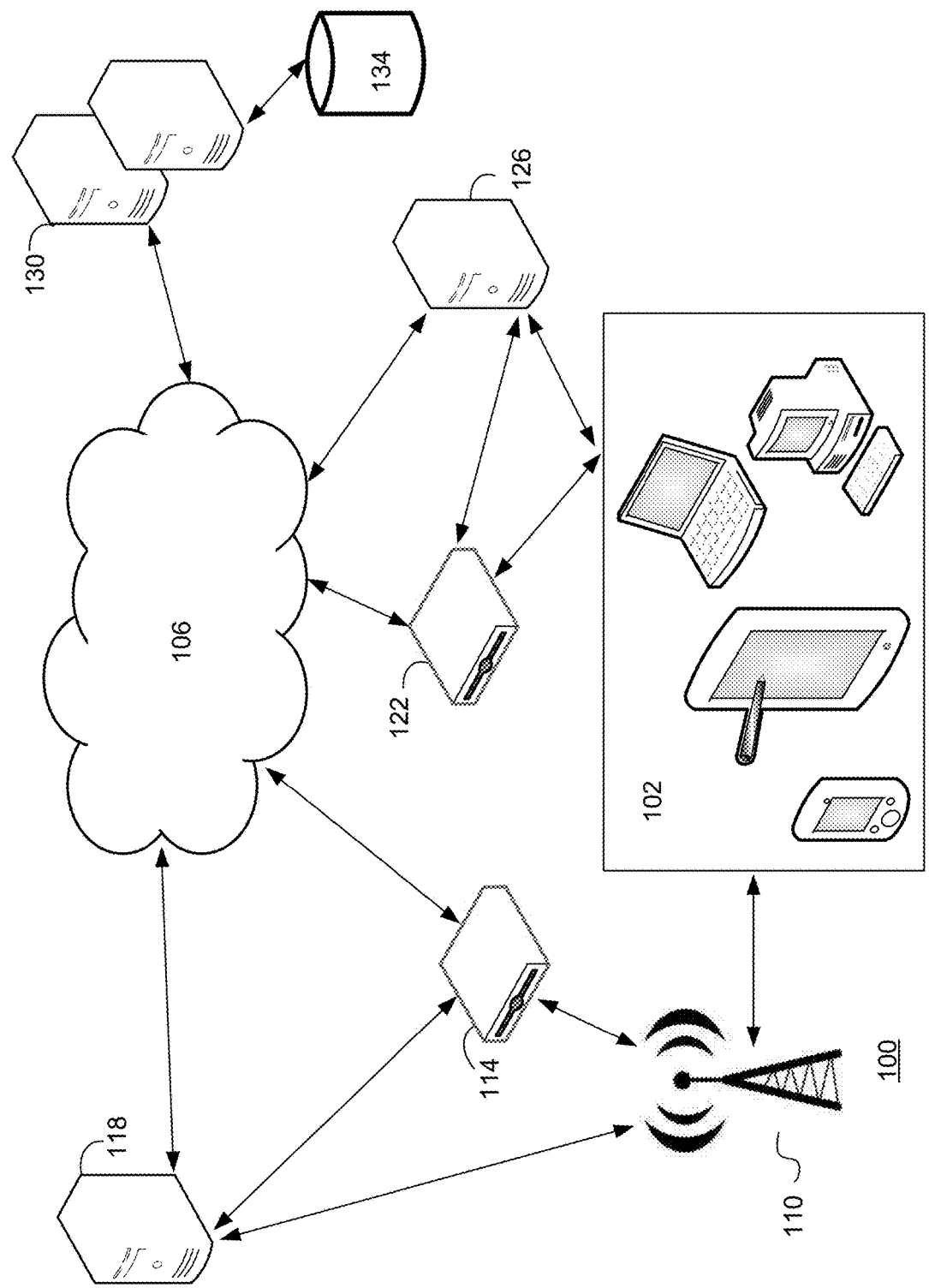
FIG. 1 is a diagram showing an example network on which the system and methods disclosed here may run, in accordance with certain embodiments.

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the invention to these particular embodiments. In other instances, well-known data structures, timing protocols, software operations, procedures, and components have not been described in detail so as not to unnecessarily obscure aspects of the embodiments of the invention.

Overview

The internet provides opportunities for users to search for and obtain information. But this information is only useful to a user if it is obtainable, displayable, and digestible. And with the sheer amount of searchable data available today, the question isn't whether the material sought after is available, but how to find it and organize the results. Data access and searching are therefore becoming as important as the amount of actual data to be searched.

At the same time, the way users interact with their client devices is changing. Not every device that can access the internet today has a physical keyboard for example. Many devices, both wired and wireless, such as smart phones, tablet computers and hybrids of such devices, use virtual keyboards which are displayed on the screens and allow users to interact by touch. These keyboards can be cumbersome and using them often results in input errors. Attempts at fixing these shortcomings, by using auto complete, for example, also often result in errors. Thus, users of such touch enabled devices become adverse to long, typed out entries. That is why they are seldom used for word processing. But even for short tasks, such data entry procedures and results can be poor.

The ramifications of such data input using touch enabled devices becomes clear when users start using shorter search terms on such touch enabled devices. But short search terms return simplified search results, based only on the generic and base search terms. To combat this, the innovations here allow for simple and short searches, but through the use of sub searches described in detail below, more rounded and robust search results. These results are further categorized into sub search categories that allow users to digest the search results. A clean presentation also adds to the appeal.

For the devices that allow for touching the screen to interact with the page, the search results can be scrolled and/or combed for relevant results using, instead of a cursor, a finger or stylus or other such pointing device to select objects on a screen. In this way, systems that run on such devices are configured to allow for scrolling by touching and dragging in a particular direction. They also allow for zooming in by pulling opposing touches apart and zooming out by pulling opposing touches together. The disclosures here utilize such touch enabled interactions and empower users to navigate search results and displays using these touch interactions.

Example Network

FIG. 1 is a diagram of a network system 100 according to certain example embodiments. In this example, a user client 102 can be any number of user devices such as a tablet computer or mobile smartphone. It could also be a laptop, desktop, e-reader, personal digital assistant, or any other kind of computing device. The client 102 is shown in communication with a network 106 via options of a wireless and wired connection, shown as examples. This is because although many tablet computers and smartphones connect to the internet wirelessly, there are still computing devices that connect to the internet over a hard wired land line. Here, both a wireless connection via an antenna 110 and a land line via routers 114, 122 and servers 118, 126 are shown as examples. But the path of communication between the client device 102 and the internet 106 or network could be any number of paths, as long as the communication is able to take place.

The wireless example could be via a cellular system or a shorter range system such as WiFi. Any wireless example could be used with a network connection. Further, the wireless example is depicted by showing a server 118 and router 114 in communication with the wireless antenna 110 in communication with the client device 102. The wireless antenna 110 could be any number of wireless access points including but not limited to, a cell tower or a shorter range antenna such as a WiFi antenna or other similar device. This example wireless connection allows the client 102 to connect to the internet 106 or other network, such as a LAN, WAN, etc.

Similarly, the wired connection leads to the network/internet 106 through a router 122 or via the router 122 and then a server 126 or straight through the server 126. The example network 106 could be the internet 106 or any number of other networks including, but not limited to an intranet, an extranet, the World Wide Web, or it may be a combination of such networks. In some embodiments, the communication network 100 uses the HyperText Transport Protocol (HTTP) to transport information using the Transmission Control Protocol/Internet Protocol (TCP/IP). The HTTP permits client computers to access various documents available via the communication network 100. The various embodiments of the invention, however, are not limited to the use of any particular protocol.

In some embodiments, the system servers that host the search engines and/or display drivers 130 could be any number of servers. These servers are not only in communication with the internet 106 or other network, but also with a database 134. The database could be any number of data storage facilities that house data including but not limited to distributed databases and/or centrally located databases. The database 134 could even be cloud based data storage system, which, if depicted, would show a communication back to the internet or other network 106.

In some embodiments, the client users 102 are configured to load and run applications that allow users to communicate with the network 106. Applications, such as those described below, capable of searching the internet and returning search results may also be run on such devices. In other examples, the user devices 102 do not run a separate application, but instead access the system itself to run searches and obtain results, over the internet.

Search Results User Interface Examples

Figure 2:
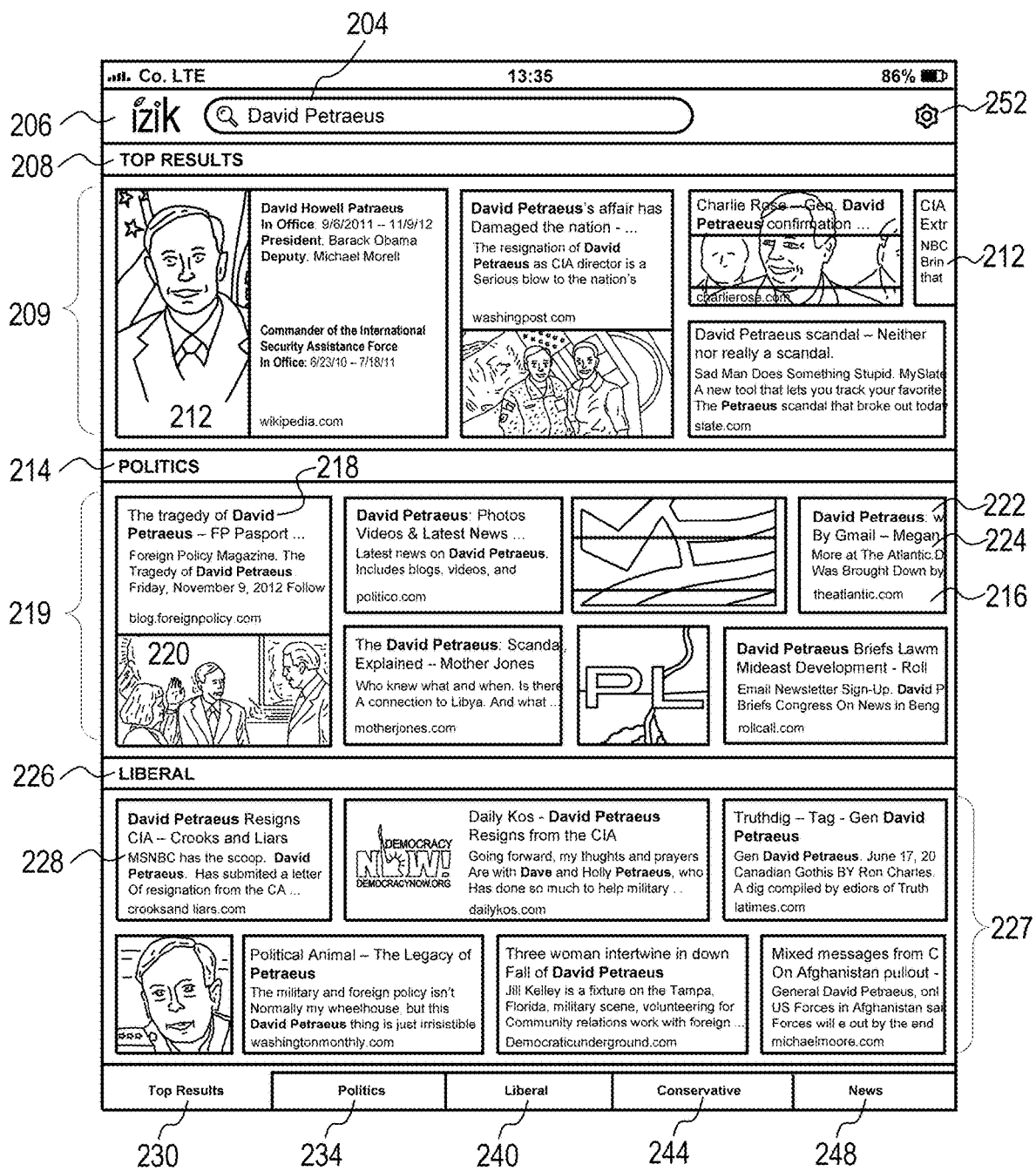
FIG. 2 is an example screen shot of a results page of an example search in accordance with certain embodiments.

FIG. 2 is an example of a screen display 200 of an example search query result 200 in accordance with some embodiments. It should be noted that any combination of items shown in the figure could make up the user interface. The example shown in FIG. 2 is exemplary only and could be modified or adapted in different circumstances and embodiments. In FIG. 2, the screen display/user interface 200 illustrates an example of the display 200 viewed by a user at a client, such as any client 102 of FIG. 1 over a network. In some embodiments, the user enters key words, shortcuts, operators, and/or other search text and symbols, collectively known as "search terms," to conduct search queries. Once the user enters one or more search terms, the user selects (e.g., by clicking/tapping on) a search button to initiate a database search in a search database. Another embodiment example starts to display search results while the user inputs text into the search box. In this way, before a search button is even clicked or tapped, the user is shown suggested search queries or even search results.

At the top of the example search results display page 200 is the search input box 204. This box 204 is where the user has typed in a search term. This search box 204 reflects what the user has input as the search term or terms for this query, in this example, "David Petraeus," and the results displayed below the box relate to this query. The displayed shape of the search box could be any number of displays. This example also shows a magnifying glass icon, signifying that it is a search box. Again, any kind of identifier or field could be used to show that this is the user entry field for this query. Additionally, the search box 204 could be used to start a new search by erasing this search term or terms and entering a new set of term or terms. In that example, when executed, the old search results would be replaced with the new search results.

To the left of the search box 204 is the proprietary name of this system, in this case "izik" 206 but the name could be any identifier, logo, name, etc. of the system. Other embodiments could omit this or show other icons or terms.

Below the search box 204 the screen is divided into multiple bands of information. These bands are separated by blocks or dividers shown here with headings such as "Top Results" 208 heading with corresponding band 209, "Politics" 214, with corresponding band 215, and "Liberal" 226 with corresponding band 227. The number of bands of information could be any number, with this example showing three.

The content of each band is populated with search results relating to the overall base search term and also the sub search terms. In one example, the base term of "David Petraeus" 204 is also searched with the related sub search term "politics" 214. In certain embodiments, the system may populate these bands as sub searches of the general overall search. Sub search terms and searches are addressed in more detail below, as are the population of such bands.

Regarding the display of search results, in each separate band, for example the politics band, 216 the search results are displayed inside tiles, blocks or rectangles 218. Any shape or outline could be used to distinguish the search results, but this embodiment shows a series of blocks. Inside each example tile, block or rectangle here, is a link 222 to the source of the search result as well as a short description 224 of the result and also the URL or internet address also related to the source of the result 216. An optional photo 220 also populates some of the search result tiles, blocks or rectangles 218 as found in U.S. Patent application 61/693,222 incorporated here by reference. In this way, this example embodiment causes display to users a presentation with a tiled set of results instead of listed lines of links.

In some embodiments, the first band, Top Results, 208 which contains results based on the baseline search that was input into the search box 204. In this example the Wikipedia results and photo for David Petraeus, the search topic, are shown 210. This Top Results category then, may give a broad overall summary of the search subject. To the right of the summary block 210 are other search results, just based on the underlying base search term or terms 212. In some example embodiments, this Top Results band 208 can either remain on the top of the screen while other bands are scrolled, as described below, or it can be scrolled along with the other bands. If it remains at the top, or some other anchored position, it can serve as the summary and broad topic header for the overall search results.

The content of each band may contain any number of search results. The limitation of the size of the screen may be overcome by allowing users to scroll horizontally through the results. In this way, by scrolling, many search results, for each band, can be displayed to the user.

The size of the search result blocks 218 may also be adapted to accommodate more or less information depending on the number of results in each band.

Many user devices allow for scrolling by touch screen. For these devices, the bands can be scrolled horizontally by touching inside the band, and pulling to the left or right. When the user does this, the search result blocks scroll along with the touch. And for devices not equipped with touch sensitive screens, a scroll bar or other similar device can be used to navigate the screens.

Further, a user could scroll down the page and show more bands on the screen, with more category titles. The scrolling page could continue to show the search box 204, so the user knows what the search term was for this result, or the search box could scroll along with the bands of results. In another embodiment, the "Top Results" band 208 remains at the top of the screen as the other bands are scrolled. The same could be said for the tabs section at the bottom of the screen as described below.

Again, many user devices allow for scrolling by touch screen. For these devices, the bands can be scrolled vertically by touching the page in the results areas, and pulling up or down, relative to the screen. When the user does this, the search result bands may be shown to scroll along with the touch. For non-touch enabled devices, a scroll bar or other scrolling enabling device, such as a mouse wheel, could be used to scroll the page vertically.

The bands of results may be populated according to the description described later here. In summary, the base search term is related to other search terms. These related search terms are searched and displayed in the band that correlates to the search.

The bottom of the example screen 200 shows tabs that correlate to the sub search bands. For example, the Top Results band 208 also has a Top Results tab, 230 at the bottom. The same can be said for the Politics band 214 and the Politics tab 234, as well as the Liberal band 226 and the Liberal tab 240. But the Conservative tab 244 in this example does not have a corresponding band. Neither does the News tab 248. This is because the bands containing these search results are not shown on this example screen 200 because of size limitations. Instead, a user could access these bands by scrolling down vertically, to access more bands as described above. Thus, the tabs at the bottom of the screen can show many or all of the sub search categories to which separate bands are dedicated. And even if a user cannot view all of the sub search results at once, in the bands, they are made aware of the other bands or categories, by the tabs. To access any of the tabs, a user could either scroll down, vertically, to see them, or click/tap on a tab.

This example embodiment screen 200 also shows a settings icon 252. This icon allows users to establish various settings for displays or searches.

Figure 3:
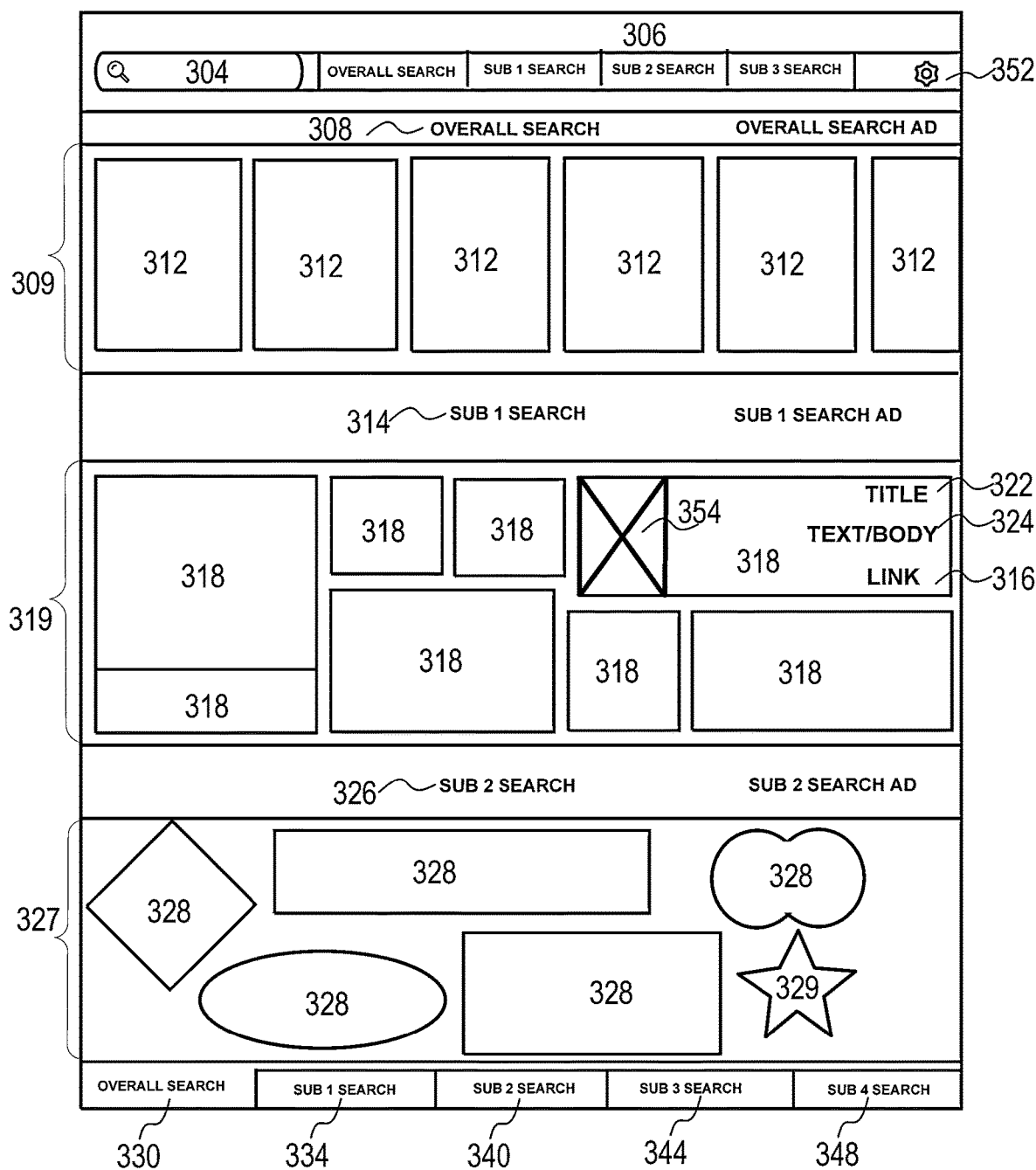
FIG. 3 is another example screen shot of a results page of an example search in accordance with certain embodiments.

FIG. 3 is a simplified version of FIG. 2, showing how the different bands of sub searches could be arranged and displayed, as well as other example features.

In FIG. 3, the search box 304 is located in the top banner of the page 306. The settings button 352 is also located in the top banner of the page 306.

In one example display shown in FIG. 3, the content of the search results are arranged in bands of search results, such as an overall search 308, a sub search one 314 and sub search two 326. The bands are arranged horizontally on the example screen, but could be arranged in any manner. The horizontal arrangement may allow for scrolling of the bands from left and right, to show more boxes of content 312, 318. These content boxes contain search results, and could take any manner of arrangement within a band, such as similarly sized, shaped, and spaced 312 to a more scattered approach with different sized boxes 318. A combination of such examples could be used, or even one with different shapes 328. For example, the boxes of content could include more than what was on the initial display page, and by scrolling left or right within the band 319, for example, more boxes of content, pertaining to that band's sub search one 314 could be displayed. It should also be noted that a box arrangement is merely exemplary. The searches could be arranged in any number of ways, but boxes are shown here for example only.

Within an example content box 318 could be any number of things showing details of the search result and sub search result. For example, the box could include a title of the search result 322. The content box could also include text describing more about the search result, in a body arrangement 324. There could also be a link 316 to the source of the search result, or a link to some related material. There could also be any number of photos or images 354 associated with the search result, displayed in the content box 318.

Further, in the example of FIG. 3, the sub searches are tabbed at the bottom, with an overall search 330, a sub 1 search 334, a sub 2 search 340, a sub 3 search 344 and a sub 4 search 348 as examples. These tabs could be used by a user to navigate to a particular search result band for review. Thus, the band for sub search one 314, corresponds to the tab such search one 334, and so on. In certain embodiments, the tabs could be located in other places such as the top of the page 306, as shown.

In certain embodiments, advertisements, or ads, could be located throughout the search results page. For example, one of the content boxes 312, 318 and/or 328 could be a sponsored ad instead of a search result. For example the start 329 could be a search targeted ad for whatever sub search two 326 included. Further, these ads could be targeted toward the search results, including the sub search results. In this way, target advertisements could appear not only topically within the overall search, but within the sub search, knowing that the user is particularly interested in a particular topic or sub topic.

In certain embodiments, ads could also be found in any of the banners 308, 34, 326, which declare the search results or sub search results. Ads could be located at the top or bottom of the pages, with or instead of the tabbed sections 330, 334, 340 344, 348 and 306.

Sub Search Band Examples

As disclosed above, certain embodiments include the receiving of certain search criteria form a user. From this "overall search" the system may be used, in certain embodiments, to spawn sub searches, related to the overall searches. These sub searches may be generated internally, or through the receipt of user generated sub search criteria. Such sub search criteria may be used to populate sub search results bands on the user interface. Thus, such subjects of the bands of sub searches may be generated by the systems and/or methods disclosed here.

As described above, simple or short searches may result in simplified or overly-general search results. But by relating the searched term to other related fields, a simple or short search can be expanded into a more robust and well-rounded set of search results, broken down by sub topic.

Further, by categorizing the sub searches, and displaying the results broken down by sub searches, the results may become more digestible for a user. The sub search categories may be used to dictate which results are found in each sub search display, such as the bands described above, so users can skip ones they find less important, and concentrate on those they find more important. This also pertains to embodiments which use targeted ads in relation to the sub searches. Users who are interested, not only in the overall search topic, but within such overall search topic, into the sub topics, may find even more targeted ads located there.

The bands in the example search results screen in FIGS. 2 and 3 show some examples of the sub searches conducted and displayed. In the example shown in FIG. 2, the search for David Petraeus results in sub searches of Politics, Liberal, Conservative, and News. These are displayed in the individual bands of results as well as in the tabs at the bottom of the screen, Top Results 230, Politics 234, Liberal 240, Conservative 244, and News 248, for example.

Some embodiments of the system are able to take a basic search input term and generate other search terms that relate to the basic term. Then these related search terms are used to conduct the sub searches and the results of those searches may be displayed by band, for example, in their separate sub-categories for the user. In some embodiments, these related searches may be generated using slashtag operators as disclosed in U.S. patent application Ser. No. 13/328,500 incorporated here by reference. In the example shown in FIG. 2, depicting a search for David Petraeus, the topical slashtags of: /politics, /liberal, /conservative, and /news may help generate more rounded results than just the results of the basic term, and be used to populate the sub search bands.

In certain embodiments, the system could generate the related sub search terms and slashtags by manipulating various algorithms. One example is through the "autoboosting" algorithm disclosed in U.S. Patent application 61/218,889, and Ser. No. 13/328,500. In this example, the query [David Petraeus] results in the /politics slashtag from the autoboost system and methods.

Another example is to use slashtag expansion. Given that certain slashtags have autoboosted, a human-generated transformation can be done. For example, every time /politics autofires, other slashtags such as /conservative and /liberal can be used to populate the category bands with results. The sub search categories can even display divergent views in these bands. In another example, a query can autoboost the slashtag /health. To this, an /alternative-medicine category band may be added to such results. In other examples, a /health band may be added to any query which autoboosts /alternative-medicine, just as examples.

Another example is to use unique words to add sub categories and/or searches. The example algorithms may not depend on any slashtags being already autoboosted. For example, the word "NoSQL" is fairly unique in referring to the "not only SQL" community of databases. Thus, a "/nosql" slashtag can be used in that instance. An input of [nosql] in the query terms, would result in this algorithm adding a /nosql band to the display of search results and sub search results. The same can be done for other unique words in the NoSQL space, such as Riak, CouchBase, Hadoop, HBase, and so forth, for example, or other categories of unique terms altogether.

Another example embodiment includes the use of ambiguous words in addition to an autoboosted slashtag to add bands. For example, the word "Cassandra" is used, among many other uses, as the name of a NoSQL database. If the word "Cassandra" is a query term in a query which autoboosts programming slashtags such as /sql, /programming, /web-development, or /Microsoft, a /nosql band may be added to the results.

Another embodiment example is to use correlation among slashtags to add bands. Topical slashtags contain lists of websites, partial websites, and so forth, which can be cross-correlated using statistical techniques, resulting in a numerical score for each other topical slashtag, with a higher score meaning better or closer correlation. For example, the /accounting slashtag can be cross-correlated with the following results:

| /money | 0.77 |
|---|---|
| /federal-agencies | 0.34 |
| /investing | 0.33 |
| /economics | 0.20 |
| /taxes | 0.18 |
| /irs | 0.11 |
| /tech | 0.02 |
| /retirement-planning | 0.02 |

Using this data, and any query which autoboosts /accounting, sub searches may be added to the result starting with /money, /federal-agencies, etc. in certain embodiments. This can be done until either the maximum number of additions from this sub-algorithm (for example 5), is exceeded, or too low of a cross-correlation score (for example 0.30). In this example, these limits would add 3 sub category bands, for example.

More Slash Examples

Users may perform a search by typing a few keywords into a box or text-enabled field, not thinking about what search engine features, such as the use of slashtags (or other search operators), might improve their search. To aid these users in getting better results, an algorithm may be utilized to generate alternative search results which contain different keywords and/or slashtags, but that are related to the initial search query. Such algorithm may be executed as the auto-slashtag server.

As an example, consider the search keywords [kung pao chicken]. The search engine system may already include slashtag "/recipes" which contain a selection of high-quality recipe websites. The user may not use "/recipes," but the auto-slashtag server may determine that the collection of websites associated with "/recipes" may be relevant to the query and that many of the results for [kung pao chicken] would be labeled as recipe websites. In some embodiments, the determination is based on criteria considered by the auto-slashtag server, such as the results of a trial search of the original terms [kung pao chicken]. Subsequently, an alternative search of [kung pao chicken /recipes] is generated by running an alternate search based on the auto-slashtag generated search query, and the alternate results are presented to the user. The alternate results may be presented to the user in any number of ways, such as a replacement of the initial search or would-be search, displayed parallel to the initial search, as an optional link to the alternate result list, and so on.

The auto-slashtag server may generate more than one alternate search query or different types of alternate searches based on different combinations of keywords and/or slashtag operators, each of which may produce more than one search result list that the user may select to view. The original user search query may, for example, be altered by adding or deleting search keywords:

Example: [the the]→[the the /music]

Or by adding a slashtag and also possibly adding deleting search keywords:

Examples: [tofurky recipe]→[tofurky /recipe]
[kung pao chicken]→[kung pao chicken /recipe].

In some embodiments, the alternatives may be generated by using a manually-generated list of transformations.

Manually-generated list of transformations may be one or more rules that providing manually-generated instructions or instructions for considering a set or listing of slashtags that may be constructed based on user preferences, interests, or in any user-customized manner. An example rule is: "If a query contains the keyword 'recipe' or 'recipes', delete it and add the slashtag /recipe." This may improve recipe searches, but likely produces a poor alternative for the search [recipe for disaster]. A better rule is, "If the final keyword is 'recipe' or 'recipes', delete it and add the slashtag /recipe" since most users would type "recipe" at the backend of other food keywords in a query (e.g., kung pao chicken recipe).

Other methods for determining how alternative searches are generated may include the use of semantic analysis of the search keywords. If the search keywords look like a person's name [Bob Truel], the auto-slashtag server may select "/people" as a candidate slashtag. If keywords look like a street address, "/map" may be selected as a candidate slashtag.

Additional Slash Operator Examples

User interaction with search engines typically begins with a user generated query submitted to the engine via a query input box, which is then answered by the display of a set of results. Quite often, the user is looking for something other than the results they are shown, so the user refines his or her query so as to produce a new set of results. This back and forth continues until the correct set of results (from the user's perspective) is achieved. Currently the only tools provided to users to help in this process are the keywords the user concocts. The distributed database described in previous sections provide more comprehensive search results, one that allows users to select from a wealth of information that includes content-specific information and technical information about the source of content. The organizational structure of the swarm architecture provides powerful search tools to allow users to find the results they are looking for at higher speeds.

The operators themselves are wrapped into a specific syntax recognized by the database structures, and any other database systems configured to use operators. In some embodiments, a user appends any query with the "I" character and then the selected operator. For example, if the user is interests in only news articles for the query "Tiger Woods" as indicated in a query box, the submitted search query is "Tiger Woods /news." The operator for limiting the search to only news articles is "/news." If the user was interested in searching for just blog results, the user would submit "Tiger Woods /blogs," where the operator for limiting the search to only blogs is "/blogs." Many types and categories of operators, such as operators could be used.

In some embodiments, the operators may include the same type of content or topic as content tags and content filters, or the subject matter may overlap with the content tags and content filters described in previous sections. In some embodiment, search results from queries that include operators are displayed and organized by content tag lists (or filter lists). The content tag lists, include the one or more topics indicated by the operator entered as part of the search query in query box. In some embodiments, the content tag lists includes predetermined tags that are also common operators, such as operators. In some embodiments, the content tag list includes a wider range of topics.

Example operators may include mainstream operators such as relevance, date, news sources, blog, photos, shop, local. Content operators may be used as well, such as traffic, joke, map, etc. Some examples may include:

| Operator | Task | Example Query |
| --- | --- | --- |
| /calendar | Search for a day on the calendar | Thanksgiving /calendar |
| /define | Look up a definition of a word | Awesome /define |
| /help | Navigates to this help page | /help |
| /joke | Shows a random joke | /joke |
| /map | Show a map of a particular place | San Francisco, CA /map |
| /quote | Show the stock price for a particular trading symbol | BAC /quote |
| /randquery | Searches a random query | /randquery |
| /traffic | Show traffic conditions for a particular place | San Francisco, CA /traffic |
| /weather | Show the weather for a particular place | San Francisco /weather |

Example operators may include facet operators. In some embodiments, certain operators, facet operators, assist in particular types of searches, such as to limit search to anchor text only "/anchoronly", and searches for only to blog sites may be limited by including the operator "/blog." Some facet operators may imply a different ranking algorithm from the usual. For example, a /cartoon search might rank URLs according to the size and number of images on the page. This would bias the results to be free galleries of images instead of the entrance pages for pay cartoon websites. A comprehensive list of facet operators are shown, but is not limited to, the facet operators listed the table below.

| Operator | Task | Example Query |
| --- | --- | --- |
| /anchoronly | Limit search to anchor text only | Skrenta /anchor |
| /audio | Search only sites with audio capability | Polka /audio |
| /blogs | Search only blog sites | Izik /blogs |
| /bug | Files a bug report for a specific query | Bill Dan /bug |
| /cluster=[n] | For a particular query, determines the number of results that will show up from any one site | Dell computers /cluster=2 |
| /nocluster OR /cluster=0 | Turns off clustering of results for queries | Engadget /nocluster OR Engadget /cluster=0 |
| /comments | Search only sites that have commentary | Obama /comments |
| /date | Rank results by chronological order | Mike Arrington /date |

In some embodiments, searches can be limited to URL operators, as listed in the table below. For example, "/seo" results in the SEC) page of a particular URL. Other URL operators include, but are not limited to, the operators in this table.

| Operator | Task | Example Query |
| --- | --- | --- |
| /anchor | Show anchors and anchor count for a given URL | http://www.gigaom.com/ /anchor |
| /cache | View cached version of URL | http://www.gawker.com/ /cache |
| /link | Search for URLs that link to a particular URL | http://www.skrenta.com/abouthtml /link |
| /seo | Navigates to the SEO page of a particular URL | http://battellemedia.com/ /seo |
| /sitelink | Search for URLs that link to a particular site | http://www.techcrunch.com /link |

-continued

| Operator | Task | Example Query |
|---|---|---|
| /whois | Show link to whois data for a particular URL | http://www.techmeme.com/whois |

In some embodiments, another category of operators include list operators. These list operators are driven by a list containing types of content including, but not limited to, domain names (google.com), URL path prefixes (espn.com/nfl, which would match both espn.com/nfl/team1 and espn.com/nfl/team2), and individual URLs. In addition, a list operator might include other list operators, or use special query operators, facet operators, or URL operators to add to or subtract from the list operator.

| Operator Name | Content Data | Content Type | Example Query |
|---|---|---|---|
| huffpo | http://huffingtonpost.com/ | distance-1 | Barack Obama/huffpo |
| techmeme | http://techmeme.com/ | | Barack Obama/techmeme |
| fail | http://failblog.org/ | domain name | |
| | http://shipmentoffail.com/ | domain name | |
| | http://screwups.com/fail | path prefix | |

Figure 4:
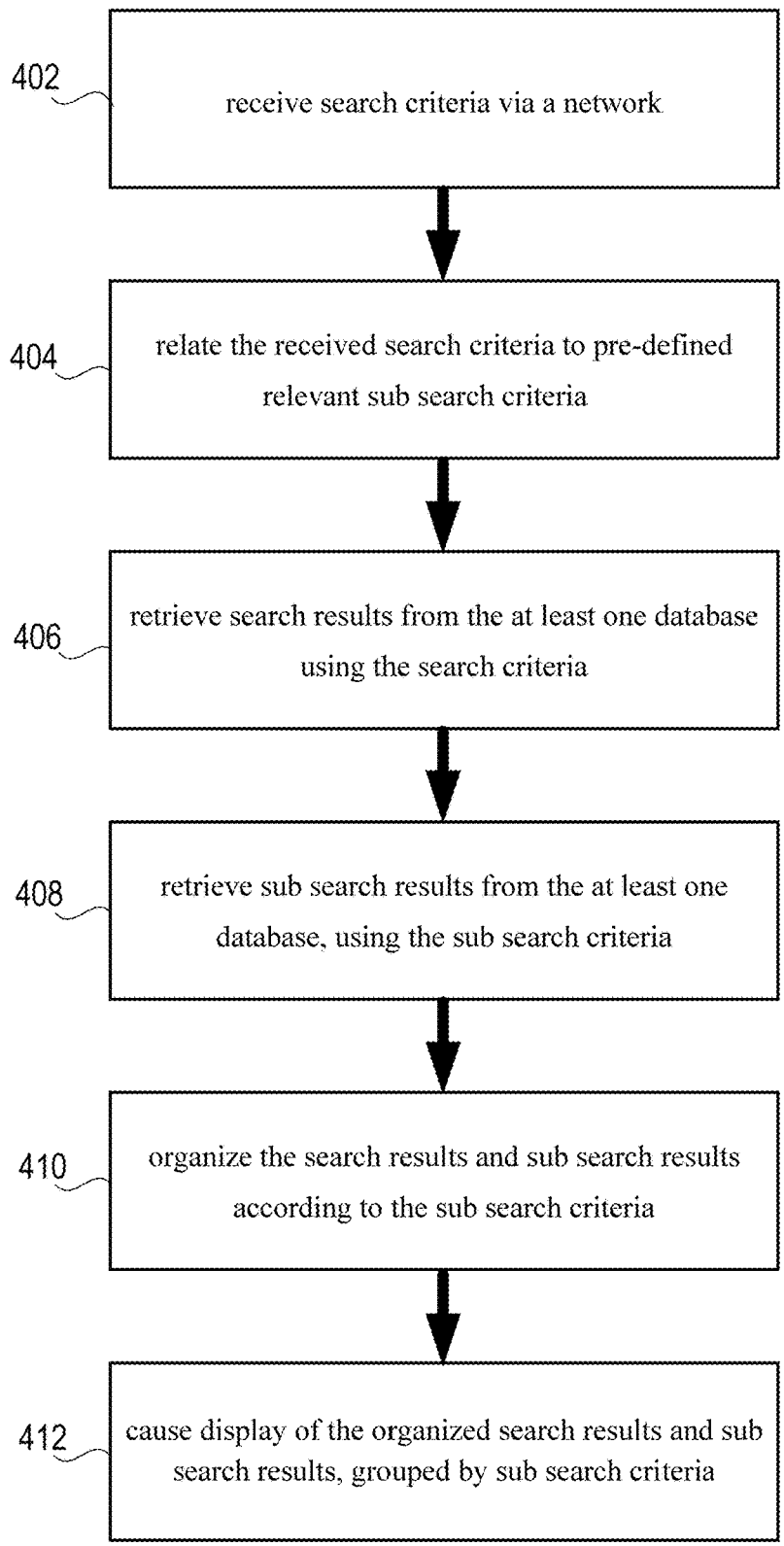
FIG. 4 is a flow diagram of an example search and/or displays methods in accordance with certain embodiments.

FIG. 4 shows an example flow diagram of how one example embodiment establishes a search and displays such a search, over a network. In the FIG. 4 example, the steps are laid out for what a computing device, such as a server may do, one which may be in communication with a database and a network. In this example embodiment, first, the server would receive search criteria via the network 402, relate the received search criteria to pre-defined relevant sub search criteria 404. Next, retrieve search results from the at least one database using the search criteria 406, then retrieve sub search results from the at least one database, using the sub search criteria 408. Then, organize the search results and sub search results according to the sub search criteria 410 and cause display, via the network, of the organized search results and sub search results, grouped by sub search criteria 412.

Some example embodiments here also allow for a login to the system, in order to customize and/or link the user who logs in, to other third party websites. In this way, a user could link other sites, such as the user's social networking pages, to the system here, in order to share search results. In some example embodiments, the same login criteria could be used for this system, along with the user's third party webpages, and the accounts can be linked.

For example, in certain embodiments, a user may log into the system and the linked third party website at the same time, before submitting any search criteria. Then, when the search criteria is entered, and the system matches that search to sub search criteria, and displays the search results, the system can push the search results in a summary form, to the user's social networking page. The system could also gather information from the user's social networking page or third party webpage, if the user has designated that information as shared information. This information could be used to steer sub search criteria as well as targeted advertising to the user on the system.

CONCLUSION

As disclosed herein, features consistent with the present inventions may be implemented via computer-hardware, software and/or firmware. For example, the systems and methods disclosed herein may be embodied in various forms including, for example, a data processor, such as a computer that also includes a database, digital electronic circuitry, firmware, software, computer networks, servers, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

We claim:

1. A method of searching a network, comprising, via a server in communication with at least one data storage and a network:
    receiving search criteria including one or more key words via the network;
    matching the search criteria to pre-defined sub search criteria, where the sub search criteria includes a predetermined operator prepended to a first term, and a facet operator including the predetermined operator prepended to a clustering term and a predetermined number that are associated with a clustering action, where matching information between the sub search criteria and the search criteria is stored in a look up table;
    retrieving search results from the at least one data storage using the one or more key words of the search criteria;
    retrieving sub search results from the at least one data storage using the sub search criteria, where the sub search results are limited to the predetermined number associated with the clustering action from any one web site;
    organizing the search results and sub search results according to the sub search criteria;
    causing display, via the network, of the organized search results and sub search results, grouped by sub search criteria, the display including:
        a top results band including a summary of the search results, and
        scrollable bands according to the sub search criteria, each scrollable band including:
            a label corresponding to the first term of the sub search criteria, and
            sub search results corresponding to the first term of the sub search criteria.

2. The method of claim 1 wherein the display of the organized search results includes one or more headings.

3. The method of claim 1 wherein the network is a wide area network.

4. The method of claim 1 wherein the scrollable bands further include tiles of the sub search results, including a photo, link, title, and summary.

5. The method of claim 1, further comprising:
    matching the sub search criteria to the search criteria based on a relevance between them;
    storing matching information between the sub search criteria and the search criteria in the data storage, to enable retrieval of the matching sub search criteria in response to the data storage being queried with the search criteria; and
    linking a login credential to a third party social networking website, wherein:
    the sub search criteria further includes the predetermined operator prepended to a second term that ranks the search results by chronological order,
    the search criteria is matched to pre-defined sub search criteria by performing a semantic analysis on the one or more key words, and
    the data storage is a cloud based data storage.

6. The method of claim 1, wherein the sub search criteria further includes the predetermined operator prepended to a second term that limits a search of the one or more key words of the search criteria to news articles.

7. The method of claim 1 further comprising, via the server in communication with the at least one data storage and the network, correlating the sub search results to at least one related advertisement.

8. The method of claim 7 further comprising, via the server in communication with the at least one data storage and the network:
    correlating the search results to at least one related advertisement;
    correlating the sub search results to at least one related advertisement;
    retrieving the at least one related advertisement related to the search results;
    retrieving the at least one related advertisement related to the sub search results; and causing display, via the network; of the related advertisement related to the search results; and of the related advertisement related to the sub search results.

9. The method of claim 1 wherein the data storage is a cloud based data storage.

10. The method of claim 1 further comprising, via the server; matching the sub search criteria to the search criteria based on a relevance between them; and storing matching information between the sub search criteria and the search criteria in the data storage, to enable retrieval of the matching sub search criteria in response to the data storage being queried with the search criteria.

11. The method of claim 1, wherein the sub search criteria further includes the predetermined operator prepended to a second term that limits a search of the one or more key words to anchor text.

12. The method of claim 1 wherein the search criteria is matched to pre-defined sub search criteria by performing a semantic analysis on the one or more key words.

13. The method of claim 1 further comprising, via the server, linking a login credential to a third party social networking website.

14. A system of searching a network, comprising:
a server in communication with at least one data storage and a network, configured to:
receive search criteria including one or more key words via the network;
match the search criteria to pre-defined sub search criteria, where the sub search criteria includes a predetermined operator prepended to a first term, and a facet operator including the predetermined operator prepended to a clustering term and a predetermined number that are associated with a clustering action, where matching information between the sub search criteria and the search criteria is stored in a look up table;
retrieve search results from the at least one data storage using the one or more key words of the search criteria;
retrieve sub search results from the at least one data storage using the sub search criteria, where the sub search results are limited to the predetermined number associated with the clustering action from any one web site;
organize the search results and sub search results according to the sub search criteria;
cause display, via the network, of the organized search results and sub search results, grouped by sub search criteria, the display including:
a top results band including a summary of the search results, and
scrollable bands according to the sub search criteria, each scrollable band including:
a label corresponding to the first term of the sub search criteria, and
sub search results corresponding to the first term of the sub search criteria.

15. The method of claim 1, further comprising:
cross-correlating a plurality of lists of websites, where the plurality of lists of websites is associated with a plurality of topical slashtags, the topical slashtags each including the predetermined operator prepended to one of a plurality of predetermined terms;
as a result of the cross-correlating, determining for each of the topical slashtags, a plurality of numerical scores, where for each of the topical slashtags, each of the plurality of numerical scores indicates a correlation between the topical slashtag and another topical slashtag of the plurality of topical slashtags; and
automatically implementing additional sub searches utilizing at least a portion of the plurality of topical slashtags, based on the plurality of numerical scores, wherein a number of the additional sub search results is limited by a maximum number of additional sub search results as well as a minimum numerical score.

16. The method of claim 1, further comprising:
cross-correlating a plurality of lists of websites, where the plurality of lists of websites is associated with a plurality of topical slashtags, the topical slashtags each including the predetermined operator prepended to one of a plurality of predetermined terms;
as a result of the cross-correlating, determining for each of the topical slashtags, a plurality of numerical scores, where for each of the topical slashtags, each of the plurality of numerical scores indicates a correlation between the topical slashtag and another topical slashtag of the plurality of topical slashtags; and
automatically implementing additional sub searches utilizing at least a portion of the plurality of topical slashtags, based on the plurality of numerical scores, wherein a number of the additional sub search results is limited by a maximum number of additional sub search results as well as a minimum numerical score;
matching the sub search criteria to the search criteria based on a relevance between them;
matching the sub search criteria to the search criteria based on a relevance between them;
storing matching information between the sub search criteria and the search criteria in the data storage, to enable retrieval of the matching sub search criteria in response to the data storage being queried with the search criteria;
linking a login credential to a third party social networking website, wherein:
the sub search criteria further includes the predetermined operator prepended to a second term that ranks the search results by chronological order, the search criteria is matched to pre-defined sub search criteria by performing a semantic analysis on the one or more key words, and
the data storage is a cloud based data storage.

17. The system of claim 14 wherein the scrollable bands further include tiles of the sub search results, including a photo, link, title, and summary.

18. The method of claim 1, wherein the data storage is a cloud based data storage;
wherein the sub search criteria further includes the predetermined operator prepended to a second term that limits a search of the one or more key words to web sites containing commentary.

19. The method of claim 1, wherein the sub search criteria further includes the predetermined operator prepended to a second term that limits a search of the one or more key words to blog sites.

20. The system of claim 14 wherein the server is further configured to:
correlate the search results to at least one related advertisement,
correlate the sub search results to at least one related advertisement,
retrieve the at least one related advertisement related to the search results from the at least one data storage using the search criteria,
retrieve the at least one related advertisement related to the sub search results from the at least one data storage using the sub search criteria, display, via the network, the related advertisement related to the search results in the scrollable category band corresponding to the search results, and display, via the network, the related advertisement related to the sub search results in the scrollable category band corresponding to the sub search results.

21. The system of claim 14 wherein the data storage is a cloud based data storage.

22. The system of claim 14 wherein the server is further configured to match the sub search criteria to the search criteria based on a relevance between them; and store matching information between the sub search criteria and the search criteria in the data storage, to enable retrieval of the matched sub search criteria in response to the data storage being queried with the search criteria.

23. The system of claim 22 wherein the stored matching information between the sub search criteria and the search criteria is in a form of a look up table.

* * * * *